United States Patent [19]

Drori

[11] 4,314,582
[45] Feb. 9, 1982

[54] COMBINED PRESSURE-REGULATOR AND MANUAL SHUT-OFF VALVE

[76] Inventor: Mordeki Drori, 89 Zahal St., Kiron, Israel

[21] Appl. No.: 717,356

[22] Filed: Aug. 24, 1976

Related U.S. Application Data

[63] Continuation-in-part of Ser. No. 669,663, Mar. 23, 1976, abandoned, and a continuation-in-part of Ser. No. 495,497, Aug. 4, 1974, abandoned.

[51] Int. Cl.³ .............................................. F16K 31/14
[52] U.S. Cl. ................................ 137/495; 137/505.18
[58] Field of Search .................... 137/505.18, 495, 113, 137/605.4; 251/60

[56] References Cited

U.S. PATENT DOCUMENTS

| | | | |
|---|---|---|---|
| 2,364,812 | 12/1944 | Pierson | 137/495 X |
| 2,542,390 | 2/1951 | Brown | 251/DIG. 1 |
| 2,713,989 | 7/1955 | Bryant | 251/DIG. 1 |
| 2,788,192 | 4/1957 | Mountford | 137/505.18 X |
| 3,251,376 | 5/1966 | Worden | 137/505.18 X |
| 3,358,964 | 12/1967 | Cohen | 137/505.18 X |
| 3,446,241 | 5/1969 | Skoli | 251/60 X |
| 3,561,478 | 2/1971 | Taplin | 137/625.4 |
| 3,779,268 | 12/1973 | Conkling | 137/113 |

Primary Examiner—Harold W. Weakley
Attorney, Agent, or Firm—Benjamin J. Barish

[57] ABSTRACT

A combined pressure-regulator and manual shut-off valve is described wherein the valve may be either manually shut-off or made operative to maintain a substantially constant outlet pressure under both flow and non-flow conditions. The device includes a piston and a disc both having substantially the same surface area and connected together with the disc being normally disposed on the outlet side of an opening between the outlet and inlet of the device, and the piston being movable within a cylinder against the action of a spring. A rod is connected to the piston, and manual presetting means presets the rod either to one position wherein the disc is disposed within the opening between the inlet and outlet so that the device acts as a manual shut-off valve, or to another position wherein the disc is disposed on the outlet side of the opening and is urged by the spring away from the opening. In the latter position, the device acts as a pressure-regulator wherein an increase in outlet pressure causes the piston to move the disc towards the opening to regulate the outlet pressure during both fluid flow and non-flow conditions.

3 Claims, 8 Drawing Figures

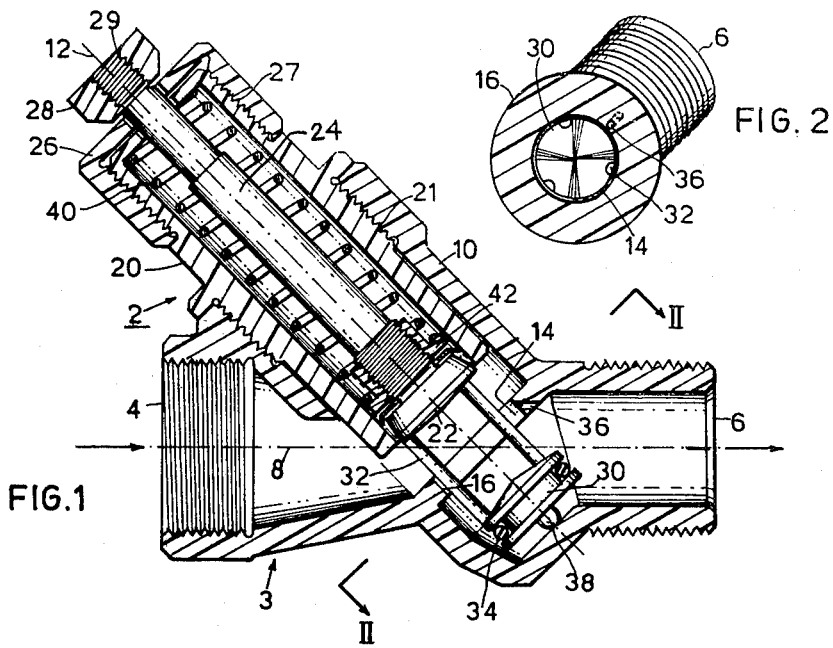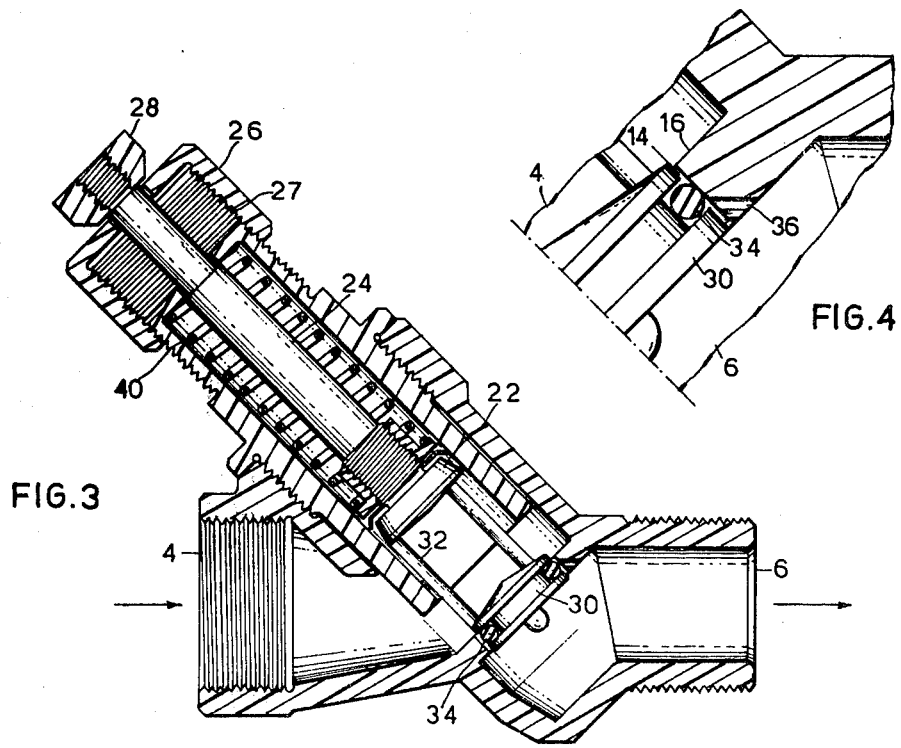

COMBINED PRESSURE-REGULATOR AND MANUAL SHUT-OFF VALVE

RELATED APPLICATIONS

The present application is a continuation-in-part of, and is constituted of subject matter from, my pending U.S. patent application Ser. No. 495,497, Aug., 4, 1974 and my pending U.S. patent application Ser. No. 669,663, Mar. 23, 1976, both abandoned.

BACKGROUND OF THE INVENTION

The present invention relates to a combined pressure-regulator and manual-shut-off valve.

A large number of pressure regulators are known for regulating the pressure of a fluid line. Many of the known regulators, however, do not include a manual shut-off means so that a separate shut-off valve is required. Others do not regulate under non-flow conditions so that if there is no flow downstream of the device (e.g. by a downstream valve being closed), the high unregulated pressure is transmitted downstream thereby requiring the line to be designed to withstand the higher pressure.

An object of the present invention is to provide a simple, inexpensive and efficient combined pressure-regulator and manual shut-off valve which may be preset to operate either as a valve or as a pressure-regulator, and in the latter operation, is effective to regulate the outlet pressure even under non-flow conditions.

SUMMARY OF THE INVENTION

According to one aspect of the present invention, the device comprises a housing having an inlet and an outlet connected together by an opening, a cylinder fixed to the housing and aligned with the opening at the inlet side, a piston movable within the cylinder, a spring urging the piston outwardly of the cylinder, a disc connected to the piston and having an inner surface area substantially equal to the surface area of the piston, and a rod connected to the piston and extending through the outer end of the cylinder. Manual presettable means are provided cooperable with the rod for moving same either to a first position wherein the disc carried by the piston is disposed on the outlet side of the opening and is urged by the spring away from the opening, or to a second position wherein the disc is disposed within the opening to shut-off the flow therethrough. Accordingly, when the presetting means is preset in its second position, the device acts as a manual shut-off valve, thereby obviating the need for a separate manual shut-off valve; and when it is preset in its first position, the device acts as a pressure-regulator regulating the outlet pressure during both fluid flow and non-flow conditions. Thus, if another valve downstream of the device should be closed terminating the flow through the regulator, the regulator will nevertheless maintain the lower regulated pressure, rather than subjecting the downstream section of the line to the higher unregulated pressure, thereby obviating the need to design the downstream section of the line to withstand the higher unregulated pressure.

When such a regulator is used for water irrigation purposes, for example, the valve may remain closed for long periods of time, e.g. up to six months or more, and the high compression of the spring may therefore strain the parts of the regulator. Accordingly, an improved construction is also described below wherein the spring is under a relatively light compression when the valve is closed, thereby substantially reducing the possibility of straining parts of the device even when the valve remains closed for long periods of time.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view of one form of combined pressure-regulator and manual shut-off valve constructed in accordance with the invention;

FIG. 2 is a sectional view along lines II—II of FIG. 1;

FIG. 3 is a view similar to that of FIG. 1 but showing the closed position of the valve;

FIG. 4 is an enlarged fragmentary view of a portion of the device of FIG. 3;

DESCRIPTION OF THE PREFERRED EMBODIMENTS

Figure 6:
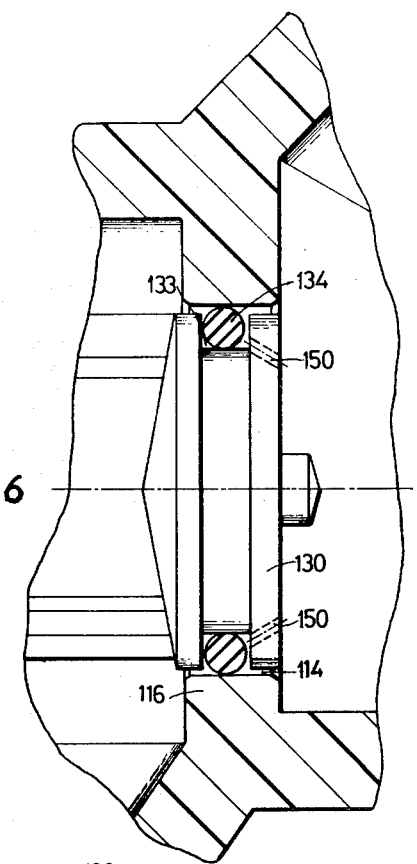
FIG. 6 is an enlarged fragmentary view more clearly illustrating a further feature of this improved construction.

The device illustrated in FIGS. 1-4 of the drawings comprises a housing 2 formed with an inlet 4 and an outlet 6 having a common axis 8. The housing further includes a cylindrical extension 10 whose axis 12 is inclined at an acute angle (about 45 degrees) with respect to axis 8. Coaxial with axis 12 is a circular opening 14 connecting the inlet 4 to the outlet 6, opening 14 being defined by an annular inwardly-extending flange or shoulder 16 integrally formed within the housing.

A cylinder 20 is fixed, as by threads 21, within housing extension 10 in alignment with opening 14 at the inlet 4 side thereof. Movable within cylinder 20 is a piston 22 carried at one end of a rod 24, the opposite end of the rod passing through an opening formed in the outer end of cylinder 20, and also through an opening formed in a cap 26 threaded at 27 in external threads formed in that end of the cylnder. A nut 28 is threaded at 29 onto the end of piston rod 24.

A disc 30 is fixed to the opposite end of piston 22 and serves as a stop engaging the outer face of the cap by means of a plurality of spaced rods 32 extending through opening 14. The cross-sectional area of the disc is substantially the same as that of piston 22, and its diameter is the same as that of opening 14 so that it can be snugly received within the opening and shut-off the flow of the fluid through it. The outer periphery of the disc carries an annular sealing ring 34 to effect a seal between the disc and the annular shoulder 16 when the disc is within the opening. This is the fully closed position of the disc illustrated in FIGS. 3 and 4. As shown particularly in FIG. 4, in this closed position of the disc, its sealing ring 34 covers a bore 36 passing through annular shoulder 16 from its inner surface through its wall at the outlet side of the device, or seats between the bore and the inlet face of disc 30.

The fully-opened position of the disc is illustrated in FIG. 1, wherein it will be seen that an embossment 38 formed on the outer face of the disc limits against the inner wall of the housing. The disc is urged to this fully-open position by a coil spring 40 within cylinder 20, one end of the spring bearing against a collar 42 carried by piston rod 24, and the opposite end bearing against the end wall of the cylinder. Rods 32 connecting disc 30 with piston 22 engage the sides of opening 14 and guide the movement of the disc and piston during the movement of the latter within cylinder 20. The spacings between rods 32 constitute passageways permitting the flow of the water through the opening between the disc and piston during all positions of the disc except the fully-closed position illustrated in FIGS. 3 and 4.

The device illustrated may be connected to a water supply line and may be preset either to regulate the outlet pressure of the line both during flow and non-flow conditions in the downstream section of the line or to manually shut-off the flow of the water through the line, in the following manner:

First, it will be seen that the inlet pressure is applied equally to the piston 22 and disc 30, producing substantially equal and opposite forces, therefore cancelling each other. The outlet pressure, however, is applied to the outer face of disc 30, tending to move same towards opening 14 against spring 40. Thus, the disc will "float" towards and away from the opening, enlarging and restricting same, to maintain a constant outlet pressure.

The regulated outlet pressure may be fixed, by adjusting nut 28 on the threaded end of piston rod 24. This spaces disc 30 with respect to opening 14 according to the regulated pressure desired.

Should the water flow be terminated downstream of the device, for example by closing a valve, the pressure at outlet 6 will build up to a point where it forces disc 30 to move into opening 14 connecting the inlet and outlet (FIGS. 3 and 4). Thus, if the water flow is terminated downstream, the downstream section of the line is maintained at the regulated (lower) pressure appearing at the outlet end of the regulator, rather than being subjected to the unregulated (higher) pressure at the inlet end of the regulator. Bore 36 (FIG. 1) formed in annular shoulder 16 provides a by-pass connecting the outlet 6 to the inlet 4 so that until sealing ring 34 of disc 30 seats over bore 36, or between the bore and the inlet side of shoulder 16, the outlet pressure applied to the outer face of disc 30 will be raised by the inlet pressure and will therefore move the disc further within the opening until it reaches the above-mentioned position. This by-pass thus effects a positive closing of the valve, and moreover, it prevents "hunting" during closing or during small drops in the outlet pressure, e.g. by a dripping downstream valve.

When the downstream flow is resumed, the water pressure at outlet 6 drops, whereby spring 40 moves piston 22 outwardly with respect to its cylinder 20, thereby also moving disc 30 out of opening 14 between the inlet and outlet. The device thereafter performs its normal function as a pressure-regulator.

If it is desired to manually turn-off the flow of water through the device, this may be done (as shown in FIG. 3) by threading cap 26 outwardly of threads 27 at the end of cylinder 20, forcing piston 22 to move within its cylinder until disc 30 carried by the piston is disposed in its valve-closing position within opening 14.

The device illustrated in FIGS. 1–4 is thus capable of serving as a pressure-regulator, as an automatic shut-off valve, and as a manual shut-off valve. It has been found to react very quickly and precisely to pressure changes and to have little tendency to clogging by particles such as sand. Further, since the piston and disc unit are of no larger diameter than opening 14, they may be easily removed and reinserted as a unit thereby enabling quick and easy assembly and disassembly for purposes of cleaning, repair, or the like. Also, the described arrangement, including the substantially coaxial inlet and outlet and the acutely inclined cylinder and annular flange, produces minimum pressure losses during the normal use of the device as a regulator when the valve is open. In addition, the device uses a few simple parts which can be made inexpensively of plastic.

Figure 5:
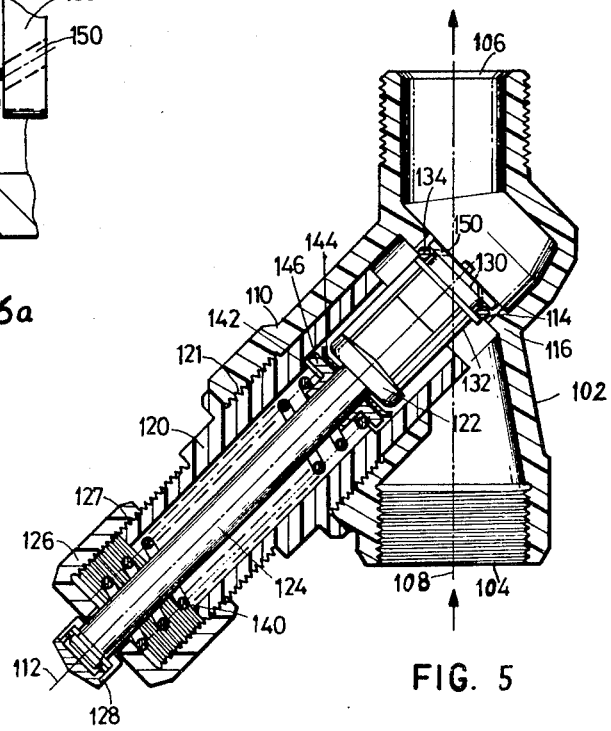
FIG. 5 is a longitudinal sectional view of a modification in the combined pressure-regulator and manual shut-off valve of FIGS. 1-4.

FIG. 5 illustrates a modification in the combined pressure-regulator and shut-off valve of FIGS. 1–4. The device of FIGS. 1–5 also comprises a housing 102 formed with an inlet 104 and an outlet 106 having a common axis 108. The housing further includes a cylindrical extension 110 whose axis 112 is inclined (about 45°) with respect to axis 108. Coaxle with axis 112 is a circular opening 114 connecting the inlet 104 to the outlet 106, opening 114 being defined by the annular surface on an inwardly-extending shoulder 116 formed in the housing. A cylinder 120 is fixed, as by threads 121, within housing extension 110 in alignment with opening 114. Movable within cylinder 120 is a piston 122 carried at one end of a rod 124, the opposite end of the rod passing through an opening formed in a cap 126 threaded at 127 onto the end of the cylinder. A nut 128 is threaded onto the end of piston rod 124.

A disc 130 is fixed to the opposite end of piston rod 124 by means of a plurality of spaced rods 132 extending through opening 114. As in FIGS. 1–4, the surface area of disc 130 is substantially the same as that of piston 122, and its cross-sectional dimensions are the same as the cross-section of opening 114 so that it can be snugly received within the opening and block the flow of the fluid through it. The outer annular surface of the disc is formed with an annular recess 133 (FIGS. 6, 6*a*), in which an O-ring 134 is seated to effect a seal between the disc and the annular shoulder 116 when the disc is seated within the opening.

A spring 140 is interposed between cap 126 and piston 122, and tends to urge the piston towards opening 114. Cap 126 may be threaded outwardly of cylinder 120, in which case it engages the inner end of nut 128 to force the nut, and piston rod 124 attached thereto, outwardly of the cylinder, thereby also drawing the piston 122 away from opening 114 until the piston limits against an annular abutment 142 formed on the inner surface of cylinder 120. When the piston is so limited, disc 130 is positioned within opening 114, thereby closing the valve, as shown in FIG. 5. A sealing ring 144 and a washer 146 are disposed between spring 140 and piston 122.

The device illustrated in FIG. 5 operates as described above with respect to FIGS. 1–4. Thus, the inlet pressure is applied equally to the piston 122 and disc 130 producing substantially equal and opposite forces which cancel each other. The outlet pressure, however, is applied to the outer face of disc 130, tending to move same towards opening 114 against spring 140. The disc will therefore "float" towards and away from the opening, enlarging and restricting same, to maintain a constant outlet pressure.

When the device is to shut-off the flow completely, cap 126 is manually turned outwardly on cylinder 124 until piston 122 limits against annular abutment 142, thereby positioning disc 130 within the opening 114. The disc is securely held in this position by nut 128 engaging cap 126, and by piston 122 limiting against abutment 142.

An advantage of the FIG. 5 arrangement over that of FIGS. 1-4, is that in the closed position of the valve as shown in FIG. 5, spring 140 is in a substantially relaxed condition, i.e. under a much lighter compression than in the FIGS. 1-4 arrangement wherein the spring is under a strong compression when the valve is closed. Thus, even though the valve remains closed for a substantial period of time, for example many months or more, the spring will not tend to strain the parts of the device, which is liable to happen in the FIGS. 1-4 arrangement.

According to a further feature in the FIG. 5 embodiment, disc 130 is formed with one or more bores 150 leading from the outlet 106 side of the disc to recess 133 in which the O-ring 134 is seated. This is more clearly illustrated in FIGS. 6 and 6a. In the FIGS. 1-4 arrangement, there is a tendency for the O-ring 134 to unseat from its recess just as the valve disc moves out from, or into, opening 114, this tendency arising by the inlet pressure being applied to the recess in such manner as to cause the O-ring 134 to jump out just as it clears (during valve-opening), or is brought into close proximity to (during valve-closing), the annular shoulder 116. In the FIG. 5 arrangement, however, bores 150 prevent this build-up of pressure within recess 133, since if the O-ring 134 moves by this pressure, it would immediately open one or more bores 150 which would thereby vent the pressure to the outlet 106 and thereby release the pressure from the recess.

Figure 7:
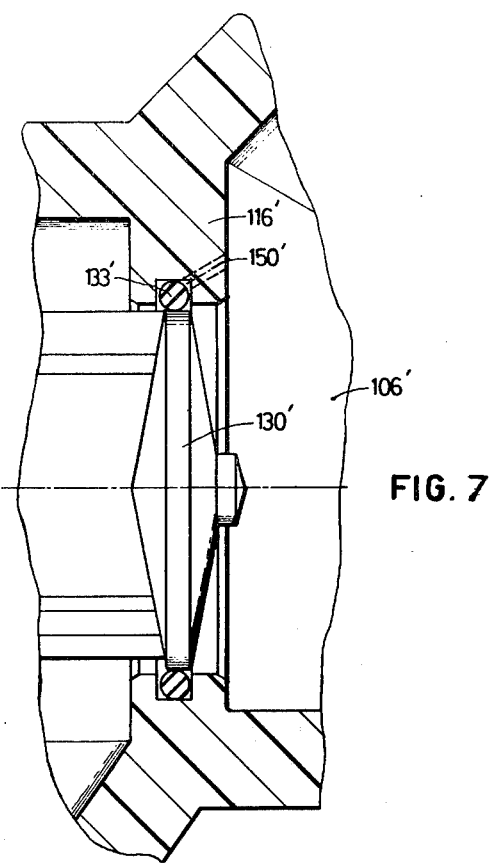
FIG. 7 is a view corresponding to that of FIG. 6 but illustrating a variation.

FIG. 7 illustrates a further variation, wherein the annular recess and O-ring seated therein are provided on the annular shoulder 116' rather than on the disc 130'. In this case, the venting bores 150' are formed through the annular shoulder 116', rather than through the disc 130', these bores extending from the outlet side 106' of the housing to the recess 133'.

Figure 6A:
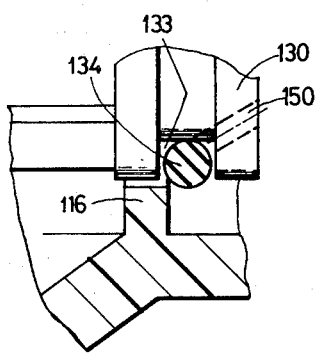
FIG. 6a is a fragmentary view illustrating the operation of the feature of FIG. 6.

The variation illustrated in FIG. 7 provides the same advantage as the corresponding arrangement in FIGS. 5, 6, 6a, in reducing the possibility of unseating the O-ring by the build-up of the inlet pressure within the recess in which the O-ring is disposed. The arrangement of FIG. 7, however, provides an additional advantage, in that it was found to substantially reduce resonance, or valve chatter, at the instant the valve is being opened or closed.

What is claimed is:

1. A fluid flow control device useful as a combined manual shut-off valve and pressure regulator effective to regulate the pressure downstream of a line during both fluid flow and non-flow conditions therein, comprising: a housing having an inlet connectable to the upstream side of the line, an outlet connectable to the downstream side of the line, and an inwardly extending annular flange formed within the housing between the inlet and outlet and defining a circular opening providing a fluid passageway therebetween, the annular flange having a longitudinal axis inclined at an acute angle to the axis of the inlet and intersecting same at the center of said opening; an internally threaded cylindrical socket formed on the housing at the inlet side thereof and having a longitudinal axis aligned with that of the annular flange and the center of said opening; an externally threaded cylinder threaded at its mid-portion within said socket; a piston of the same diameter as said opening sealingly slidable within the cylinder; a coil spring biassing means urging the piston towards said opening; a disc of the same diameter as said opening and said piston; said disc being movable from an open position on the outlet side of said opening to a closed position within said opening; a sealing ring between said disc and opening when the disc is in its closed position within said opening; connecting means including at least one rod securing the piston at the inlet side of the opening to the disc at the outlet side of the opening while permitting the fluid to flow between the disc and the piston through the opening when the disc is in its open position such that the inlet pressure is applied equally to the piston and to the confronting face of the disc producing substantially equal and opposite forces, whereas the outlet pressure is applied to the opposite face of the disc tending to move the disc, and the piston in the cylinder, against the spring biassing means, a further rod fixed to the piston and extending through the outer end of the cylinder; and manual presettable means comprising a cap axially presettable in one of two positions on the outer end of said cylinder and having an aperture through which said further rod passes, the outer end of said further rod carrying a stop engaging the outer face of the cap such that presetting the cap on the cylinder in one position away from said circular opening causes the device to act as a manual shut-off valve by fixing the disc in its closed position within said opening, and presetting the cap on the cylinder in a second position towards the opening causes the disc carried by the piston to be disposed on the outlet side of the circular opening and to be urged by the spring biassing means away from the opening whereby the device acts as a pressure-regulator wherein an increase in the outlet pressure of the fluid moves the disc towards said opening to reduce or shut-off the flow therethrough and thereby to regulate the fluid pressure during both fluid flow and non-flow conditions downstream of the line.

2. A device according to claim 1, wherein said coil spring is interposed between the piston and the cap, and the cylinder is formed with an inner abutment limiting the movement of the piston such that when the cap is moved outwardly of the cylinder to its valve-closing position as determined by the piston limiting against the abutment of the cylinder, the disc is seated within the opening to block the flow of the fluid therefrom, while the spring, interposed between the piston and the outwardly moved cap, is under a relatively light compression.

3. A fluid-flow control device serving as a combination pressure-regulator and shut-off valve, comprising: a housing having an inlet and an outlet connected together by a circular opening defined by an annular surface on the housing; a disc having an outer annular surface of substantially the same diameter as said annular surface of the housing, said disc being movable towards and away from the opening for regulating the outlet pressure and being seatable within the opening for closing the valve; a cylinder fixed to the housing at the inlet side of said opening; a piston movable within the cylinder; a spring urging the piston towards the inner end of the cylinder facing said opening; a connecting member passing through the opening and connecting the piston at the inlet side of the opening to the disc at the outlet side of the opening; the outer surface area of the piston being substantially equal to the inner surface area of the disc such that the inlet pressure applies equal and opposite forces to the piston and disc, while the outlet pressure applied to the outer face of the disc tends to move same towards the opening against the bias of said spring; an apertured cap mounted to the outer end of the cylinder and presettable thereon from a valve opening position to a valve closing position; a rod fixed to the piston and passing through the apertured cap; and a stop carried by the outer end of the rod and engaged by said apertured cap when moved to the valve closing position to draw the disc into said opening; said spring being interposed between the piston and the movable cap, and the cylinder being formed with an inner abutment limiting the movement of the piston, such that when the cap is moved outwardly of the cylinder to its valve-closing position as determined by the piston limiting against the abutment of the cylinder, the disc is seated within the opening to block the flow of the fluid therefrom while the spring, interposed between the piston and the outwardly moved cap, is under a relatively light compression.

* * * * *